United States Patent [19]

Dunn

[11] 4,142,946

[45] Mar. 6, 1979

[54] METHOD OF BONDING A METALLIC ELEMENT TO A SOLID ION-CONDUCTIVE ELECTROLYTE MATERIAL ELEMENT

[75] Inventor: Bruce S. Dunn, Schenectady, N.Y.

[73] Assignee: General Electric Company, Schenectady, N.Y.

[21] Appl. No.: 807,407

[22] Filed: Jun. 17, 1977

[51] Int. Cl.$^2$ .................... B23K 28/00; C25D 11/00
[52] U.S. Cl. ...................................... 204/16; 156/275
[58] Field of Search ................ 204/16, 195 S, 1 S; 156/272, 273, 275

[56] References Cited

U.S. PATENT DOCUMENTS

| | | | |
|---|---|---|---|
| 2,567,877 | 9/1951 | De Ment | 204/16 |
| 3,256,598 | 6/1966 | Kramer et al. | 156/272 |
| 3,397,278 | 8/1968 | Pomerantz | 174/52 |
| 3,400,054 | 9/1968 | Ruka et al. | 204/195 S |
| 3,417,459 | 12/1968 | Pomerantz et al. | 29/472.9 |
| 3,589,965 | 6/1971 | Wallis et al. | 204/16 |
| 4,070,529 | 1/1978 | Delmas et al. | 204/195 S |

*Primary Examiner*—T. M. Tufariello
*Attorney, Agent, or Firm*—Paul R. Webb, II; Joseph T. Cohen; Leo I. MaLossi

[57] ABSTRACT

A method is disclosed for bonding a moderately deformable metallic element to a solid ion-conductive electrolyte material element which contains mobile ions of a metal different from the metallic element. The method includes juxtaposing the elements, and applying an electric potential across the elements to convert a surface portion of the electrolyte material element to an ion-insulating material and to effect bonding between the juxtaposed surfaces.

7 Claims, No Drawings

METHOD OF BONDING A METALLIC ELEMENT TO A SOLID ION-CONDUCTIVE ELECTROLYTE MATERIAL ELEMENT

The present invention relates to a method of bonding a metallic element to a non-metallic element and is more particularly concerned with an improved method of bonding a metallic element to a solid ion-conductive electrolyte material element.

Reference is made to allowed copending patent application Ser. No. 807,406, filed June 17, 1977, and entitled "Composite Body" which describes a composite body which can be made in accordance with the method of the present invention.

Reference is made to copending patent application Ser. No. 807,377, filed June 17, 1977, and entitled "Composite Body, Method of Forming, and Method of Bonding" which describes another method for which can be employed to form the "Composite Body" of the above copending application Ser. No. 807,406. Both of these applications are assigned to the same assignee as the present application.

In U.S. Pat. No. 3,397,278 — Pomerantz, entitled "Anodic Bonding" and U.S. Pat. No. 3,417,459 — Pomerantz et al., entitled "Bonding Electrically Conductive Metals To Insulators" there are described methods for bonding electrically conducting metals to insulators. The methods include placing the metal and insulator to be bonded in close surface contact, heating the insulator element, thus rendering it electrically conductive, applying a voltage across the elements and passing a low electrical current through the composite for a short time. The insulator element is heated by a conductive platen to provide sufficient electrical conductivity during the application of the voltage to effect the bonding of the conductive element to the insulator.

My present invention is directed to bonding a metallic element to a solid ion-conductive electrolyte material element as opposed to the bonding of the metallic element to an insulator in the above last two referenced patents.

My method is useful to seal the outer metallic casings to the opposite surfaces of the flange in a sodium-sulfur battery. Such a sodium-sulfur battery is described in U.S. Pat. No. 3,960,596 — Mitoff et al., entitled "Battery Casing and Hermetically Sealed Sodium-Sulfur Battery." This patent is assigned to the same assignee as the present application.

The primary object of my invention is to provide an improved method of bonding a metallic element to a solid ion-conductive electrolyte material element to eliminate the problem of thermal stress.

In accordance with one aspect of my invention, a method of bonding a metallic element to a solid ion-conductive electrolyte material includes juxtaposing the major surfaces of the elements in close surface contact relationship, applying an electric potential across the juxtaposed elements to pass a finite current of low amperage through the juxtaposed elements to convert a surface portion of the ion-conductive electrolyte material element adjacent the metallic element to an ion-insulating material and to effect bonding between the juxtaposed surfaces.

These and various other objects, features, and advantages of the invention will be better understood from the following description:

I found that I could bond a metallic element to a solid ion-conductive electrolyte material element. Such a metallic element must be moderately deformable. The electrolyte material element must contain mobile ions of the metal different from the metallic element. My method comprises juxtaposing the major surfaces of the elements in close surface contact relationship, applying an electric potential across the juxtaposed elements to pass a finite current of low amperage through the juxtaposed elements to convert a surface portion of the ion-conductive electrolyte material element adjacent the metallic element to an ion-insulating material and to effect bonding between the juxtaposed surfaces.

A solid ion-conductive electrolyte material is an ideal material for a flange to seal the outer metallic casings to the opposite surface thereof and for sealing to the ionic-conductive tube in a sodium-sulfur battery. While a solid ion-conductive electrolyte material element provides an ideal material for such a flange from the standpoint of minimizing thermal stress and avoiding corrosion problems, such a material is ion-conductive as opposed to being insulating. Thus, this material is not useful as a flange in a sodium-sulfur battery. The exposed areas of metal contact to the electrolyte material element would act as shorted sodium-air seals forming $Na_2O$ and $NaOH$ at the junction and would eventually destroy the flange.

However, I found unexpectedly that my method of bonding could be employed since a surface portion of the electrolyte material element adjacent the metallic element is converted to an ion-insulating material. Thus, an insulating surface or segment is positioned between the remainder of the electrolyte material element and the metallic element.

My method includes employing a potential across the elements at ambient or elevated temperatures. My method includes bonding one major surface of the electrolyte element to a deformable metallic element. A portion of one major surface of the electrolyte material element can also be bonded to the deformable metallic element. Additionally, both major surfaces or a portion of both major surfaces of the electrolyte material element can be bonded to deformable metallic elements. Further, one major surface of the electrolyte material element can be bonded to a deformable metallic element while a portion of the other major surface of the electrolyte material element can be bonded to a second deformable metallic element.

I found that a variety of materials can be employed for the metallic elements. Such materials include various types of steels, aluminum, aluminum alloys, copper, copper alloys, silver, silver alloys, noble metals, molybdenum and silicon. The only requirement is that the metal must be moderately deformable. Various solid ion-conductive electrolyte material elements can be employed for the element. Suitable electrolyte materials include beta-alumina, which term is used in the present application to include beta-alumina, beta"-alumina, mixtures thereof, and related compounds. For example, suitable beta-aluminas include lithium beta-alumina, hydronium beta-alumina, and silver beta-alumina. Other electrolytes include those based on silver, such as, silver iodide, or silver rubidium iodide, or on lithium, such as, lithium iodide.

While my method is particularly adapted to forming a flange of a solid ion-conductive electrolyte material to which outer metallic casings are sealed to the opposite surfaces thereof for use in the sodium-sulfur battery, my method is also applicable to bonding such an electrolyte material to metallic elements to form a solid electrolyte and the metal container therefore for use in various solid-state batteries and fuel cells. Thus, the solid ion-conductive electrolyte material might be in the form of a disc of this material with one or more apertures therethrough to provide a flange for use in a sodium-sulfur battery. In various solid-state batteries and fuel cells, the solid ion-conductive electrolyte material would generally be in the form of a disc or flat material.

My method of bonding is described below for forming a flange with outer metallic casings sealed thereto for use in a sodium-sulfur battery. A solid ion-conductive electrolyte material element of sodium beta-alumina is employed which has a single aperture through its center thus providing a flange or ring configuration. A pair of moderately deformable metallic elements of aluminum are provided which are in the form of casings having opposite open ends and a flange portion at one end of each casing. The flange portions of the casings are positioned against opposite major surfaces of the sodium beta-alumina element. Each aluminum casing provides an anode, while graphite paint applied to the same major surface of the sodium beta-alumina electrolyte provides a cathode. A power source in the form of a battery has its negative lead attached to the cathode, while its positive lead is attached to the anode. Such a power source with its associated leads is provided for opposite surfaces of the sodium beta-alumina. An electric potential is applied across each aluminum casing and the sodium beta-alumina electrolyte from the power source. An electric potential can be applied from both power sources at the same time to thereby pass a finite current of low amperage through the adjacent metallic and sodium beta-alumina electrolyte elements. The potential is applied at ambient or elevated temperatures. I have found that effective bonding between the metallic casings and the sodium beta-alumina electrolyte element can be accomplished by applying a current density of from 0.5 to 2.0 milliamperes per cm$^2$ for a period of time from 0.5 to 2 hours. If desired, each metallic casing can be bonded to the sodium beta-alumina electrolyte separately. The application of the potential across the elements converts a surface portion of the sodium beta-alumina electrolyte to an ion-insulating material which is positioned adjacent the flange of the aluminum casing. In this manner bonding is effected between the respective flanges and the sodium beta-alumina. It will, of course, be appreciated that only one aluminum casing might be bonded to one major surface of the sodium beta-alumina.

My method includes also bonding one or both major surfaces of the sodium beta-alumina with a deformable metallic element such as aluminum foil. The foil is placed adjacent one or both surfaces of a sodium beta-alumina disc with a center aperture. The aluminum foil provides the anode, while a cathode is provided by graphite conductive paint applied to the sodium beta-alumina. A power source, such as a battery, with appropriate leads to the aluminum foil and to the cathode is employed to provide the electric potential across the aluminum foil or foils and the sodium beta-alumina.

My method includes further bonding a deformable metallic element such as aluminum foil to one surface of a sodium beta-alumina containing an aperture therethrough while the other surface of the sodium beta-alumina is bonded to a metallic casing of aluminum. The same type of power source and circuit is employed in this variation of my method.

Examples of bonding a metallic element to a solid ion-conductive electrolyte material element are set forth:

EXAMPLE I

A solid ion-conductive electrolyte material element of sodium beta-alumina is provided which has a single aperture through its center thus providing a flange or ring configuration. A pair of moderately deformable metallic elements of aluminum are provided in the form of casings having opposite open ends and a flange portion at one end of each casing. The flange portions of the casings are positioned against opposite major surfaces of the sodium beta-alumina element. Each aluminum casing provides an anode, while graphite paint applied to the sodium beta-alumina electrolyte provides a cathode. The assembly of the sodium beta-alumina element and the aluminum casings is heated in a furnace at a temperature of 500° C. A power source in the form of a battery is provided for each cathode and anode pair. The negative lead of the battery is attached to the cathode, while the positive lead is attached to the anode. An electric potential is applied across each aluminum casing and the sodium beta-alumina electrolyte at the same time to thereby pass a finite current of low amperage through the adjacent metallic and sodium beta-alumina electrolyte elements. Effective bonding between the metallic casings and the sodium beta-alumina electrolyte element is accomplished by a current density of one milliampere per square centimeter for a period of one hour. My method converts a surface portion of the sodium beta-alumina electrolyte to an ion-insulating material which is positioned adjacent each flange of the aluminum casing.

EXAMPLE II

The method of Example I was followed except that each of the two aluminum casings was separately bonded to the opposite major surfaces of the sodium beta-alumina element.

EXAMPLE III

The method of Example I was followed except that only one aluminum casing was bonded to a single major surface of the sodium beta-alumina element, and the temperature employed was 400° C.

EXAMPLE IV

A solid ion-conductive electrolyte material element of sodium beta-alumina was provided which has a single aperture through its center thus providing a flange or ring configuration. A pair of moderately deformable metallic elements of aluminum were provided in the form of aluminum foils. The foils were positioned against opposite major surfaces of the sodium beta-alumina element. Each foil provided an anode, while graphite paint applied to the sodium beta-alumina electrolyte provided a cathode. The assembly of the sodium beta-alumina element and the aluminum foils was heated in a furnace at a temperature of 525° C. A power source in the form of a battery was provided for each cathode and anode pair. The negative lead of the battery was attached to the cathode, while the positive lead was attached to the anode. An electric potential was applied across each foil and the sodium beta-alumina electrolyte at the same time to thereby pass a finite current of low amperage through the adjacent metallic and sodium beta-alumina electrolyte elements. Effective bonding between the foils and the sodium beta-alumina electrolyte element was accomplished by applying a current density of one milliampere per square centimeter for a period of one hour. My method converted a surface portion of the sodium beta-alumina electrolyte to an ion-insulating material which is positioned adjacent each foil of the aluminum casing.

EXAMPLE V

The method of Example IV was followed except that each of the two aluminum foils was separately bonded to the opposite major surfaces of the sodium beta-alumina element, and the temperature employed was 100° C.

EXAMPLE VI

The method of Example IV was followed except that only one aluminum foil was bonded to a single major surface of the sodium beta-alumina element, and the temperature employed was 25° C.

EXAMPLE VII

A solid ion-conductive electrolyte material element of sodium beta-alumina is provided which has a single aperture through its center thus providing a flange or ring configuration. A pair of moderately deformable metallic elements of aluminum are provided. One element is in the form of casings having opposite open ends and a flange portion at one end. The other element is an aluminum foil. The flange portion of the casing is positioned against one major surface of the sodium beta-alumina element while the aluminum foil is positioned against the opposite major surface. Each aluminum element provides an anode, while graphite paint applied to the sodium beta-alumina electrolyte provides a cathode. The assembly of the sodium beta-alumina element and the aluminum elements is heated in a furnace at a temperature of 500° C. A power source in the form of a battery is provided for each cathode and anode pair. The negative lead of the battery is attached to the cathode, while the positive lead is attached to the anode. An electric potential is applied across each aluminum element and the sodium beta-alumina electrolyte from the power source at the same time to thereby pass a finite current of low amperage through the adjacent metallic and sodium beta-alumina electrolyte elements. Effective bonding between the metallic elements and the sodium beta-alumina electrolyte element is accomplished by a current density of one milliampere per square centimeter for a period of one hour. My method converts a surface portion of the sodium beta-alumina electrolyte to an ion-insulating material which is positioned adjacent each of the aluminum elements.

EXAMPLE VIII

The method of Example VII is followed except that each of the two aluminum elements are separately bonded to the opposite major surfaces of the sodium beta-alumina element.

While other modifications of the invention and variations thereof which may be employed within the scope of the invention have not been described, the invention is intended to include such as may be embraced within the following claims.

What I claim as new and desire to secure by Letters Patent of the United States is:

1. A method of bonding at least one moderately deformable metallic element to a solid ion-conductive electrolyte material element containing mobile ions of a metal different from the metallic element which comprises juxtaposing the major surfaces of the elements in close surface contact relationship, applying an electric potential across the juxtaposed elements to pass a finite current of low amperage through the juxtaposed elements to convert a surface portion of the ion-conductive electrolyte material element adjacent the metallic element to an ion-insulating material and to effect bonding between the juxtaposed surfaces.

2. A method as in claim 1, in which one major surface of the electrolyte material element is bonded to the deformable metallic element.

3. A method as in claim 1, in which a portion of one major surface of the electrolyte material element is bonded to the deformable metallic element.

4. A method as in claim 1, in which both major surfaces of the electrolyte material element are bonded to deformable metallic elements.

5. A method as in claim 1, in which a portion of both major surfaces of the electrolyte material element are bonded to deformable metallic elements.

6. A method as in claim 1, in which one major surface of the electrolyte material element is bonded to a deformable metallic element, and a portion of the other major surface of the electrolyte material element is bonded to a second deformable metallic element.

7. A method as in claim 1, in which the deformable metallic element is made of aluminum, and the electrolyte material element is made of sodium beta-alumina.

* * * * *